Figure 1:
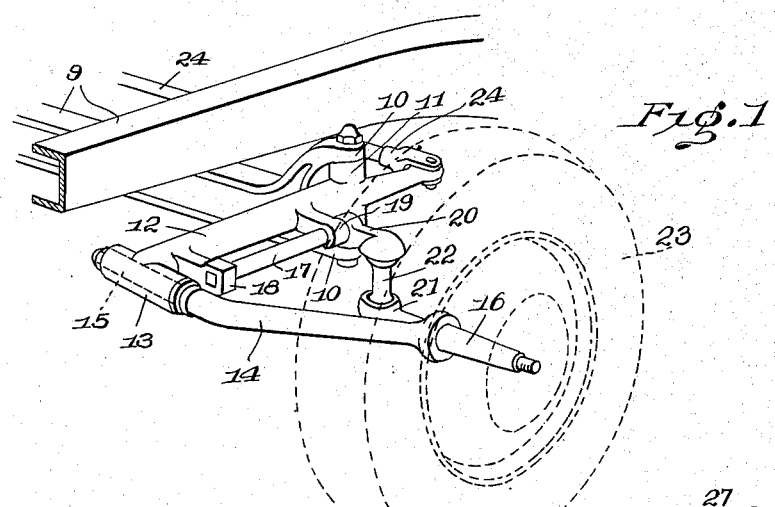

Nov. 12, 1940.   K. L. SCHIFF   2,220,916

SPRING SUSPENSION

Filed Nov. 19, 1937

INVENTOR.
Karl Ludwig Schiff

Patented Nov. 12, 1940

2,220,916

UNITED STATES PATENT OFFICE 2,220,916

SPRING SUSPENSION

Karl Ludwig Schiff, Philadelphia, Pa.

Application November 19, 1937, Serial No. 175,504
In Germany November 19, 1936

3 Claims. (Cl. 267—57)

The invention refers to spring suspension of steered wheels especially for motor vehicles. It is an object of the invention to make possible or at least facilitate the use of torsion springs for such wheel suspension in which each wheel is borne by one end of the lever, the other end of which being fastened swingable around a substantially horizontal axis to a second lever which in turn is mounted swingable around a substantially vertical axis to the chassis framework or a self-sustaining body.

The details of the invention and its advantages are explained in the following description of some embodiments when read in connection with the attached drawing.

Figure 2:
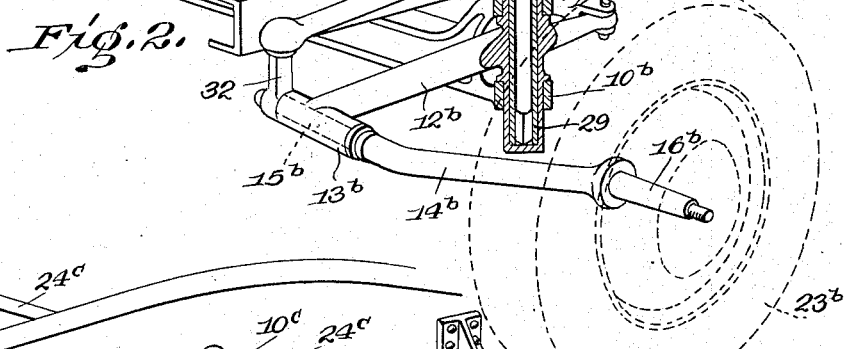

The drawing shows diagrammatically and perspectively in,

Fig. 1 one embodiment of the invention;

Fig. 2 a second embodiment, and

Figure 3:
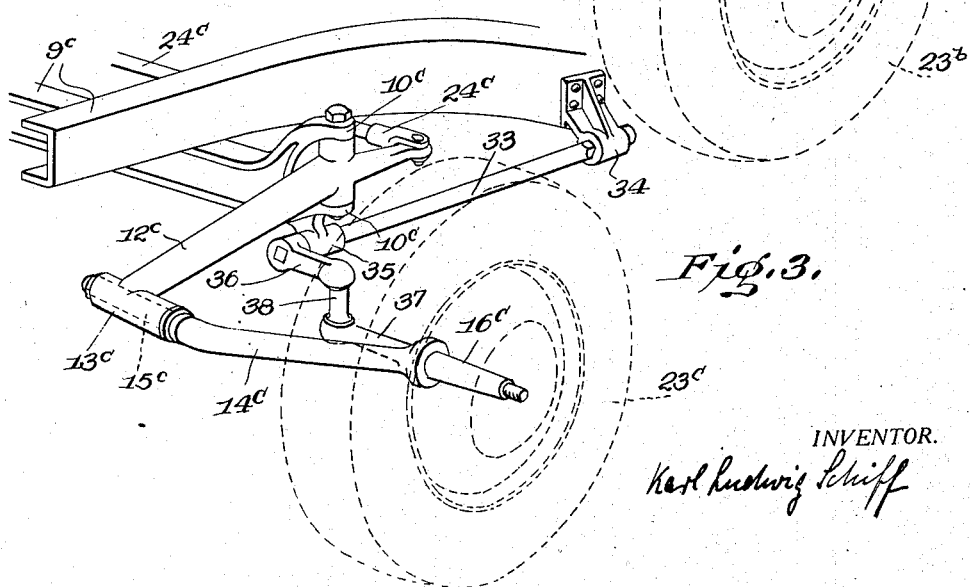

Fig. 3 a third embodiment of the invention.

Bearings 10 of the chassis frame 9 support a steering knuckle 11. An arm or member 12 is rigidly connected to this knuckle 11. A second lever 14 has a horizontal arm 15 and is supported by said arm in a bearing 13 provided at the free end of the arm 12. The other end of the lever 14 is provided with an axle 16 supporting the steered wheel 23. The member 11, 12 is connected to the steering mechanism in any known manner by the steering rods 24. The torsion spring 17 is fastened by one of its ends at 18 to the arm 12 near the bearing 13. The spring 17 is rotatably supported near its other end by bearing 19 rigidly connected to the arm 12. The rotatably supported end of the spring 17 is rigidly connected with an arm 20. A link 27 is journaled to the arm 20 and to the extension 21 of lever 14. It is obvious that the wheel 23 and its axle 16 can only be moved upwardly with respect to the chassis frame 9 in twisting the spring 17 by means of the intermediate members 14, 21, 22 and 20.

Many modifications of the embodiment according to Fig. 1 are possible. The spring may for instance be mounted on lever 14 or one torsion spring arrangement may be mounted on lever 12 and a second one on lever 14. These two spring arrangements act together in supporting the wheel. Moreover, many different means may be used for connecting the spring and the levers.

The embodiment shown in Fig. 2 shows a tubular steering knuckle 11b supported rotatably around the vertical axis in bearings 10b of the chassis frame 9b. This steering knuckle 11b is again rigidly connected to a lever 11b which in turn supports by a bearing 13b, the arm 15b of a second lever 14b. The lever 14b shows again the axle 16b supporting rotatably the steered road wheel 23b. The axle knuckle 11b is connected to the steering rod 24b in any convenient manner. A torsion spring 28 is arranged within the tubular steering knuckle 11b and one of its ends is rigidly fastened to the one end wall 27 of the tubular axle knuckle 11b. The other end of the spring 28 is surrounded by a tubular member 29 which is rotatably arranged within the tubular steering knuckle 11b. This tubular member 29 may also be formed as a torsion spring. An arm 30 is rigidly connected to the free end of the tubular member 29 and projects outwardly through an opening 38 of the tube 11b. A link member 31 is journaled by one of its ends to the arm 30 and by its other end to an arm 32. The arm 32 is rigidly connected to the arm 15b of the lever 14b. If all the members connected directly and indirectly to the axle knuckle 11b are moved together with said axle knuckle, then the spring 28 or 28 and 29 respectively is not influenced at all. If, however, the wheel 23b moves up and down together with the axle 16b, then the torsion spring 28 or 28 and 29 respectively is twisted.

Also the embodiment shown in Fig. 2 allows many modifications in the details. For instance, it is not necessary that the torsion spring extends in both directions of the steering knuckle or the lever actuating the spring does not have to be fastened near the middle of the spring. Moreover, the spring does not necessarily have to be arranged co-axially with the steering knuckle but may for instance be arranged parallel to but spaced from the axis of that knuckle.

The embodiment according to Fig. 3 shows again chassis frame members 9c, bearings 10c, an axle knuckle 11c, a lever 12c connected with said knuckle, a bearing 13c on the free end of said lever, a second lever 14c supported by an arm 15c in said bearing 13c and provided with an axle 16c supporting the wheel 23c, and, finally, a steering rod 24c connecting the axle knuckle 11c with the steering mechanism (not shown). So far the embodiment according to Fig. 3 corresponds exactly to the embodiment shown in Fig. 1. A torsion spring 33 is mounted substantially horizontally on the chassis frame in such a manner than one of its ends is rigidly connected at 34 to the chassis 9c whereas the spring is supported near its second end rotatably by a bearing 35 forming a part of the chassis frame. The rotatably mounted end of the spring 33 is provided with an arm 36 and the lever 14c is provided with an extension 37. A link member 38 is journaled to the ends of arm 36 and extension 37 respectively by journals 39 and 40 allowing universal movement. In the normal position, these journals are arranged co-axially with the axis of the steering knuckle 11c. The steering movements again do not influence the spring and the spring is actuated only by the up and down movement of the wheel 23c together with the end of lever 14c relative to the chassis frame.

Also this last embodiment allows many modifications. The spring may for instance be arranged in any angular position with respect to the longitudinal direction of the car.

All expressions used in the foregoing description and in the following claims have to be taken in their broadest sense. The expression "torsion spring" is intended not only to comprise torsion rods made from steel, but, for instance, also such torsion springs comprising rubber members. The expression "chassis frame" is intended to comprise also self-sustaining bodies and combined chassis and body underframes. Finally, it has to be pointed out that in all embodiments the single lever 14, 14b or 14c respectively may be substituted by two or more levers as it is well known to those skilled in the art.

What I claim is:

1. In a vehicle, a steering knuckle mounted rotatably around a substantially vertical axis on the chassis framework and rigidly connected with a lever, a second lever mounted rotatably around a substantially horizontal axis spaced from that steering knuckle on said first lever, a road wheel supported by said second lever at a point distant from the connecting point with the second lever, a torsion spring arrangement, being mounted on the steering knuckle and extending substantially in the same direction as the axis of said knuckle, and connecting members between the second lever supporting the road wheel and said torsion spring arrangement.

2. In a vehicle according to claim 1, said torsion spring arrangement being arranged substantially coaxially with the axis of said steering knuckle.

3. In a vehicle according to claim 1, said torsion spring arrangement being arranged substantially coaxially with the axis of said steering knuckle, said steering knuckle being formed as a tubular member housing the torsion spring member.

K. L. SCHIFF.